US011704841B2

(12) United States Patent
Mashita et al.

(10) Patent No.: US 11,704,841 B2
(45) Date of Patent: Jul. 18, 2023

(54) APPARATUS FOR ESTIMATING SAMENESS OF POINT CLOUD DATA AND SYSTEM FOR ESTIMATING SAMENESS OF POINT CLOUD DATA

(71) Applicant: DAIKIN INDUSTRIES, LTD., Osaka (JP)

(72) Inventors: Tomohiro Mashita, Osaka (JP); Yuki Uranishi, Osaka (JP); Photchara Ratsamee, Osaka (JP); Kenshiro Tamata, Osaka (JP); Hiromi Ohkubo, Osaka (JP); Tadafumi Nishimura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/754,219

(22) PCT Filed: Sep. 17, 2020

(86) PCT No.: PCT/JP2020/035231
§ 371 (c)(1),
(2) Date: Mar. 28, 2022

(87) PCT Pub. No.: WO2021/065538
PCT Pub. Date: Apr. 8, 2021

(65) Prior Publication Data
US 2022/0343553 A1    Oct. 27, 2022

(30) Foreign Application Priority Data

Sep. 30, 2019  (JP) .............................. JP2019-181004

(51) Int. Cl.
*G06K 9/00*       (2022.01)
*G06T 9/00*       (2006.01)
*G06N 3/08*       (2023.01)

(52) U.S. Cl.
CPC .............. *G06T 9/002* (2013.01); *G06N 3/08* (2013.01); *G06F 2218/08* (2023.01); *G06F 2218/12* (2023.01)

(58) Field of Classification Search
CPC ......... G06T 9/002; G06T 7/00; G06T 7/0002; G06T 7/60; G06T 2207/10028;
(Continued)

(56) References Cited

U.S. PATENT DOCUMENTS

2019/0066373 A1* 2/2019 Tran ..................... G06V 10/454
2019/0206071 A1* 7/2019 Yan ....................... G06V 20/647
(Continued)

FOREIGN PATENT DOCUMENTS

JP       2012-057960       3/2012
JP       2019-101927       6/2019
(Continued)

OTHER PUBLICATIONS

International Preliminary Report on Patentability for PCT/JP2020/035231 dated Apr. 14, 2022.
(Continued)

*Primary Examiner* — Andrew M Moyer
(74) *Attorney, Agent, or Firm* — IPUSA, PLLC

(57) ABSTRACT

For information about point cloud data, a point cloud data sameness estimation apparatus and a point cloud data sameness estimation system in which accuracy of evaluating sameness is improved are provided. In the present disclosure, a point cloud data sameness estimation apparatus for estimating sameness of objects that are sources of two 3-dimensional point cloud datasets includes a point cloud data acquisition unit configured to acquire first point cloud data and second point cloud data including 3-dimensional point cloud data; a first neural network configured to output a first point cloud data feature, with information about the
(Continued)

first point cloud data as an input into the first neural network; a second neural network configured to output a second point cloud data feature, with information about the second point cloud data as an input into the second neural network; and a sameness evaluation unit configured to output an evaluation about sameness of the first point cloud data and the second point cloud data, based on the first point cloud data feature and the second point cloud data feature, wherein a weight is mutually shared by the first neural network and the second neural network.

7 Claims, 9 Drawing Sheets

(58) Field of Classification Search
CPC ........ G06K 9/00496; G06N 3/02; G06N 3/08; G06N 3/045; G06N 3/084; G06N 3/09; G06N 5/041; G06F 2218/08; G06F 2218/12; G06F 18/22; G06F 18/2413; G01B 11/24; G06V 10/761; G06V 10/82; G06V 20/64

USPC ................ 382/155–160, 201, 218–221, 181
See application file for complete search history.

(56) References Cited

U.S. PATENT DOCUMENTS

| | | | |
|---|---|---|---|
| 2020/0057778 A1* | 2/2020 | Sun | G06F 16/538 |
| 2020/0058156 A1* | 2/2020 | Tran | G06N 3/045 |
| 2020/0311136 A1* | 10/2020 | Jun | G06N 3/0454 |
| 2021/0354718 A1* | 11/2021 | Lu | G06T 7/20 |

FOREIGN PATENT DOCUMENTS

| | | | | | |
|---|---|---|---|---|---|
| JP | 2019-133545 | | 8/2019 | | |
| JP | 2019149149 A | * | 9/2019 | ......... | G06K 9/00208 |
| RU | 2017105394 A | * | 8/2018 | ......... | G06K 9/00208 |

OTHER PUBLICATIONS

International Search Report for PCT/JP2020/035231 dated Dec. 8, 2020.

* cited by examiner

| TRAINING DATA | | |
|---|---|---|
| FIRST POINT CLOUD DATA | SECOND POINT CLOUD DATA | LABEL |
| $(X_{1\_1\_1}, Y_{1\_1\_1}, Z_{1\_1\_1}, R_{1\_1\_1}, G_{1\_1\_1}, B_{1\_1\_1})$ ~ $(X_{1\_1\_2048}, Y_{1\_1\_2048}, Z_{1\_1\_2048}, R_{1\_1\_2048}, G_{1\_1\_2048}, B_{1\_1\_2048})$ | $(X_{2\_1\_1}, Y_{2\_1\_1}, Z_{2\_1\_1}, R_{2\_1\_1}, G_{2\_1\_1}, B_{2\_1\_1})$ ~ $(X_{2\_1\_2048}, Y_{2\_1\_2048}, Z_{2\_1\_2048}, R_{2\_1\_2048}, G_{2\_1\_2048}, B_{2\_1\_2048})$ | SAME |
| ... | ... | ... |
| $(X_{1\_2\_1}, Y_{1\_2\_1}, Z_{1\_2\_1}, R_{1\_2\_1}, G_{1\_2\_1}, B_{1\_2\_1})$ ~ $(X_{1\_2\_2048}, Y_{1\_2\_2048}, Z_{1\_2\_2048}, R_{1\_2\_2048}, G_{1\_2\_2048}, B_{1\_2\_2048})$ | $(X_{2\_1\_1}, Y_{2\_1\_1}, Z_{2\_1\_1}, R_{2\_1\_1}, G_{2\_1\_1}, B_{2\_1\_1})$ ~ $(X_{2\_1\_2048}, Y_{2\_1\_2048}, Z_{2\_1\_2048}, R_{2\_1\_2048}, G_{2\_1\_2048}, B_{2\_1\_2048})$ | NOT SAME |
| ... | ... | ... |

| | TYPE OF OBJECT | | | | | | |
|---|---|---|---|---|---|---|---|
| | chess | fire | heads | office | pumpkin | redkitchen | stairs |
| NUMBER OF PAIRS OF LOCAL 3-DIMENSIONAL POINT CLOUD DATASETS THAT ARE THE SAME | 1806 | 2010 | 926 | 1226 | 1413 | 1786 | 1229 |
| NUMBER OF PAIRS OF LOCAL 3-DIMENSIONAL POINT CLOUD DATASETS THAT ARE NOT THE SAME | 4446 | 5508 | 1345 | 2990 | 3310 | 4630 | 2804 |

9b

| | TYPE OF OBJECT | | | | | | |
|---|---|---|---|---|---|---|---|
| | chess | fire | heads | office | pumpkin | redkitchen | stairs |
| PRECISION | 0.9778 | 0.9545 | 1.0000 | 0.9687 | 0.9025 | 0.9298 | 1.0000 |

APPARATUS FOR ESTIMATING SAMENESS OF POINT CLOUD DATA AND SYSTEM FOR ESTIMATING SAMENESS OF POINT CLOUD DATA

TECHNICAL FIELD

The present disclosure relates to a point cloud data sameness estimation device and a point cloud data sameness estimation system.

BACKGROUND OF THE INVENTION

Conventionally, a technique of creating a 3-dimensional model using what is known as "information about point cloud data", such as 3-dimensional point cloud data obtained by measuring the actual environment or data after converting to a data format differing from the 3-dimensional point cloud data, is known.

When creating a 3-dimensional model using such modeling techniques, it is important to appropriately align (evaluate sameness of) respective "information about point cloud data" differing in various measurement conditions such as the measurement direction or measurement position, measurement distance, measurement timing, or type of measurement device, when measuring the actual environment.

RELATED ART DOCUMENTS

Patent Documents

Patent Document 1: Unexamined Patent Application Publication No. 2019-101927

SUMMARY OF THE INVENTION

Problem to be Solved by the Invention

The present disclosure provides a point cloud data sameness estimation device and a point cloud data sameness estimation system that improve evaluation accuracy of sameness with respect to information about point cloud data.

Means for Solving the Problem

With respect to a first aspect of the present disclosure, a point cloud data sameness estimation apparatus for estimating sameness of objects that are sources of two 3-dimensional point cloud datasets includes:

a point cloud data acquisition unit configured to acquire first point cloud data and second point cloud data including 3-dimensional point cloud data;

a first neural network configured to output a first point cloud data feature, with information about the first point cloud data as an input into the first neural network;

a second neural network configured to output a second point cloud data feature, with information about the second point cloud data as an input into the second neural network; and a sameness evaluation unit configured to output an evaluation about sameness of the first point cloud data and the second point cloud data, based on the first point cloud data feature and the second point cloud data feature, wherein a weight is mutually shared by the first neural network and the second neural network.

According to the first aspect of the present disclosure, a point cloud data sameness estimation device that improves evaluation accuracy of sameness with respect to information about point cloud data can be provided.

Additionally, according to a second aspect of the present disclosure, in the point cloud data sameness estimation apparatus according to the first aspect, the weight of the first neural network and the second neural network is updated while being mutually shared, such that the sameness evaluation unit outputs an evaluation indicating high sameness, in a case of information about two 3-dimensional point cloud datasets generated from a same 3-dimensional shape being input into the first neural network and the second neural network as first training data; and the weight of the first neural network and the second neural network is updated while being mutually shared, such that the sameness evaluation unit outputs an evaluation indicating low sameness, in a case of information about two 3-dimensional point cloud datasets generated from different 3-dimensional shapes being input into the first neural network and the second neural network as second training data.

Additionally, according to a third aspect of the present disclosure, in the point cloud data sameness estimation apparatus according to the second aspect, in the first training data, deletions are made in at least one set of information or noise is added to at least one set of information, the at least one set of information being in the information about the two 3-dimensional point cloud datasets generated from the same 3-dimensional shape.

Additionally, according to a fourth aspect of the present disclosure, in the point cloud data sameness estimation apparatus according to the second aspect, the first training data is the information about the two 3-dimensional point cloud datasets generated from the same 3-dimensional shape measured under different conditions.

Additionally, according to a fifth aspect of the present disclosure, in the point cloud data sameness estimation apparatus according to the first aspect, the information about the first point cloud data and the information about the second point cloud data are each 3-dimensional point cloud data.

Additionally, according to a sixth aspect of the present disclosure, in the point cloud data sameness estimation apparatus according to the fifth aspect, the weight of the first neural network and the second neural network is updated while being mutually shared, such that the sameness evaluation unit outputs an evaluation indicating high sameness, in a case of 3-dimensional point cloud data generated from a predetermined 3-dimensional shape and 3-dimensional point cloud data generated from data in which the predetermined 3-dimensional shape is not tilted or tilted by less than a predetermined angle being input into the first neural network and the second neural network as third training data; and the weight of the first neural network and the second neural network is updated while being mutually shared, such that the sameness evaluation unit outputs an evaluation indicating low sameness, in a case of 3-dimensional point cloud data generated from a predetermined 3-dimensional shape and 3-dimensional point cloud data generated from data in which the predetermined 3-dimensional shape is tilted by the predetermined angle or greater being input into the first neural network and the second neural network as fourth training data.

Additionally, according to a seventh aspect of the present disclosure, in the point cloud data sameness estimation apparatus according to the fifth aspect, the weight of the first neural network and the second neural network is updated while being mutually shared, such that the sameness evaluation unit outputs an evaluation indicating high sameness, in a case of 3-dimensional point cloud data generated from a predetermined 3-dimensional shape and 3-dimensional point cloud data generated from data in which the predetermined 3-dimensional shape is of a same size or data in which the predetermined 3-dimensional shape is increased or reduced by the rate of increase or the rate of decrease within the predetermined range being input into the first neural network and the second neural network as fifth training data; and the weight of the first neural network and the second neural network is updated while being mutually shared, such that the sameness evaluation unit outputs an evaluation indicating low sameness, in a case of 3-dimensional point cloud data generated from a predetermined 3-dimensional shape and 3-dimensional point cloud data generated from data in which the predetermined 3-dimensional shape is increased or reduced by a rate of increase or a rate of decrease outside a predetermined range being input into the first neural network and the second neural network as sixth training data.

Additionally, according to an eighth aspect of the present disclosure, a point cloud data sameness estimation system includes a measuring device configured to measure an object and generate 3-dimensional data; and a point cloud data sameness estimation apparatus for estimating sameness of objects that are sources of two 3-dimensional point cloud datasets, wherein the point cloud data sameness estimation apparatus includes:

a point cloud data acquisition unit configured to acquire first point cloud data and second point cloud data including 3-dimensional point cloud data;

a first neural network configured to output a first point cloud data feature, with information about the first point cloud data as an input into the first neural network;

a second neural network configured to output a second point cloud data feature, with information about the second point cloud data as an input into the second neural network; and a sameness evaluation unit configured to output an evaluation about sameness of the first point cloud data and the second point cloud data, based on the first point cloud data feature and the second point cloud data feature, and a weight is mutually shared by the first neural network and the second neural network.

According to the eighth aspect of the present disclosure, for information about point cloud data, a point cloud data sameness estimation system in which accuracy of evaluating sameness is improved can be provided.

BRIEF DESCRIPTION OF THE DRAWINGS

FIG. 9 is a diagram illustrating a concrete example of an inference result.

MODE FOR CARRYING OUT THE INVENTION

Figure 1:
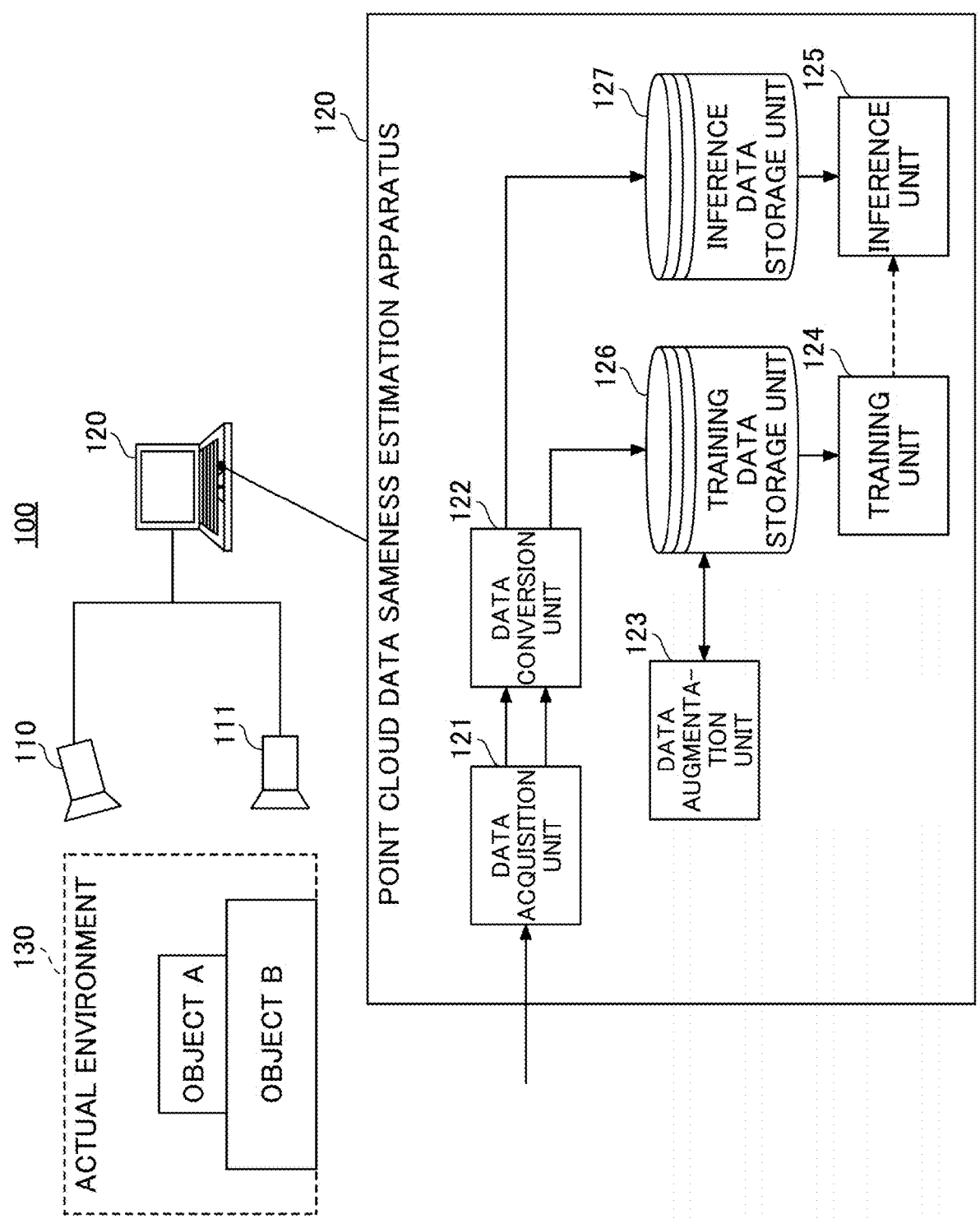
FIG. 1 is a diagram illustrating a system configuration example of a point cloud data sameness estimation system.

Hereinafter, each embodiment will be described with reference to the accompanying drawings. In the present specification and drawings, structural elements having essentially the same function are given the same reference numerals and duplicate description is omitted thereby.

First Embodiment

System Configuration of Point Cloud Data Sameness Estimation System

First, a system configuration of a point cloud data sameness estimation system according to the first embodiment will be described. FIG. 1 is a diagram illustrating an example of a system configuration of a point cloud data sameness estimation system.

As illustrated in FIG. 1, a point cloud data sameness estimation system 100 includes a first measuring device 110, a second measuring device 111, and a point cloud data sameness estimation apparatus 120. The first measuring device 110 and the second measuring device 111 are connected to the point cloud data sameness estimation apparatus 120 by wire or wirelessly.

Each of the first measuring device 110 and the second measuring device 111 measure various objects, such as an object A and an object B, loaded in the real environment 130 and generate 3-dimensional point cloud data. Each of the first measuring device 110 and the second measuring device 111 send the generated 3-dimensional point cloud data to the point cloud data sameness estimation apparatus 120.

Between the first measuring device 110 and the second measuring device 111, at least any one measuring condition from among various conditions such as measuring direction, measuring position, measuring distance, measuring timing, and type of device is assumed to differ.

Additionally, in the first embodiment, the point cloud data sameness estimation system 100 is described as having two measuring devices in the first measuring device 110 and the second measuring device 111, but the point cloud data sameness estimation system 100 may have one measuring device. Alternatively, the point cloud data sameness estimation system 100 may have three or more measuring devices.

The point cloud data sameness estimation apparatus 120 is an apparatus for evaluating sameness of objects that are two sources of 3-dimensional point cloud data.

The two 3-dimensional point cloud datasets indicate 3-dimensional data when objects are measured in a state in which each type of measuring condition, such as measuring direction or measuring position, measuring distance, measuring timing, and type of device, differs. Specifically, each of the first measuring device 110 and the second measuring device 111 indicates 3-dimensional point cloud data generated by measuring objects loaded in the real environment 130.

Various types of programs are installed in the point cloud data sameness estimation apparatus, and the point cloud data sameness estimation apparatus 120 is made to function as a data acquisition unit 121, a data conversion unit 122, a data augmentation unit 123, a training unit 124, and an inference unit 125 by executing a corresponding program.

The data acquisition unit 121 acquires 3-dimensional point cloud data sent by the first measuring device 110 and the second measuring device 111. The 3-dimensional point cloud data acquired by the data acquisition unit 121 includes 3-dimensional point cloud data acquired for use as training data and 3-dimensional point cloud data acquired for use as inference data.

The data conversion unit 122 converts the data type of 3-dimensional point cloud data acquired by the data acquisition unit 121 and generates data of data type differing from the 3-dimensional point cloud data. The data generated by the data conversion unit 122 includes data of various data types such as, for example, mesh data (polygon data), surface data, and CAD data. In the first embodiment, the data of such various data types including 3-dimensional point cloud data is collectively referred to as "information about point cloud data". However, hereinafter, for simplifying description, description will be made assuming that information about point cloud data=3-dimensional point cloud data as such, without activating the data type converting functions of the data conversion unit 122.

Additionally, the data conversion unit 122 has a dividing function of dividing the 3-dimensional point cloud data into multiple local 3-dimensional point cloud datasets representing a 3-dimensional shape of a part of the object.

Additionally, the data conversion unit 122 has a storage function configured to store multiple local 3-dimensional point cloud datasets, as training data, obtained by dividing 3-dimensional point cloud data obtained for use as training data, in a training data storage unit 126.

Specifically, the data conversion unit 122 mutually associates and stores two local 3-dimensional point cloud datasets representing 3-dimensional shapes of a same part of an object from two 3-dimensional point cloud datasets acquired by measurements from the first and second measuring devices 110 and 111 of the same object. At this time, the data conversion unit 122 also stores information indicating that the shapes are generated from the same 3-dimensional shape.

Additionally, the data conversion unit 122 mutually associates and stores two local 3-dimensional point cloud datasets representing 3-dimensional shapes of different parts of an object from two 3-dimensional point cloud datasets acquired by measurements from the first and second measuring devices 110 and 111 of the same object. At this time, the data conversion unit 122 also stores information indicating that the shapes are generated from different 3-dimensional shapes.

Additionally, the data conversion unit 122 mutually associates and stores two local 3-dimensional point cloud datasets representing 3-dimensional shapes of a part of respective objects, from two 3-dimensional point cloud datasets acquired by measurements from the first and second measuring devices 110 and 111 of different objects. At this time, the data conversion unit 122 also stores information indicating that the shapes are generated from different 3-dimensional shapes.

Additionally, the data conversion unit 122 has a storage function configured to store multiple local 3-dimensional point cloud datasets obtained by dividing 3-dimensional point cloud data obtained for use as inference data, in the inference data storage unit 127.

Specifically, the data conversion unit 122 performs storage mutually associating multiple local 3-dimensional point cloud datasets divided from 3-dimensional point cloud data acquired by the measurements of the first measuring device 110, with multiple local 3-dimensional point cloud datasets divided from 3-dimensional point cloud data acquired by the measurements of the second measuring device 111.

The data augmentation unit 123 augments training data by performing various modification processes on multiple local 3-dimensional point cloud datasets stored in the training data storage unit 126 as training data.

The training unit 124 includes a deep learning framework. The training unit 124 performs a training process of reading multiple local 3-dimensional point cloud datasets stored in the training data storage unit 126, executing a deep neural network (DNN: Deep Neural Network, for example, PointNet that is a DNN for 3-dimensional point cloud data), with 2 sets of mutually associated local 3-dimensional point cloud data as input data, and updating weight parameters included in the deep neural network (for example, PointNet that is a DNN for 3-dimensional point cloud data), with information indicating whether or not shapes are generated from same 3-dimensional shapes as labels.

The training unit 124 reflects the parameter weights adjusted by executing the training process in the inference unit 125.

The inference unit 125, similarly to the training unit 124, includes a deep learning framework for 3-dimensional point cloud data.

The inference unit 125 executes an inference process of reading multiple local 3-dimensional point cloud datasets stored in the inference data storage unit 127, executing a deep neural network (for example, PointNet that is a DNN for 3-dimensional point cloud data), with 2 sets of mutually associated local 3-dimensional point cloud data as input data, and inferring whether or not 3-dimensional shapes from two mutually associated local 3-dimensional point cloud datasets are the same.

Hardware Configuration of Point Cloud Data Sameness Estimation Apparatus

Figure 2:
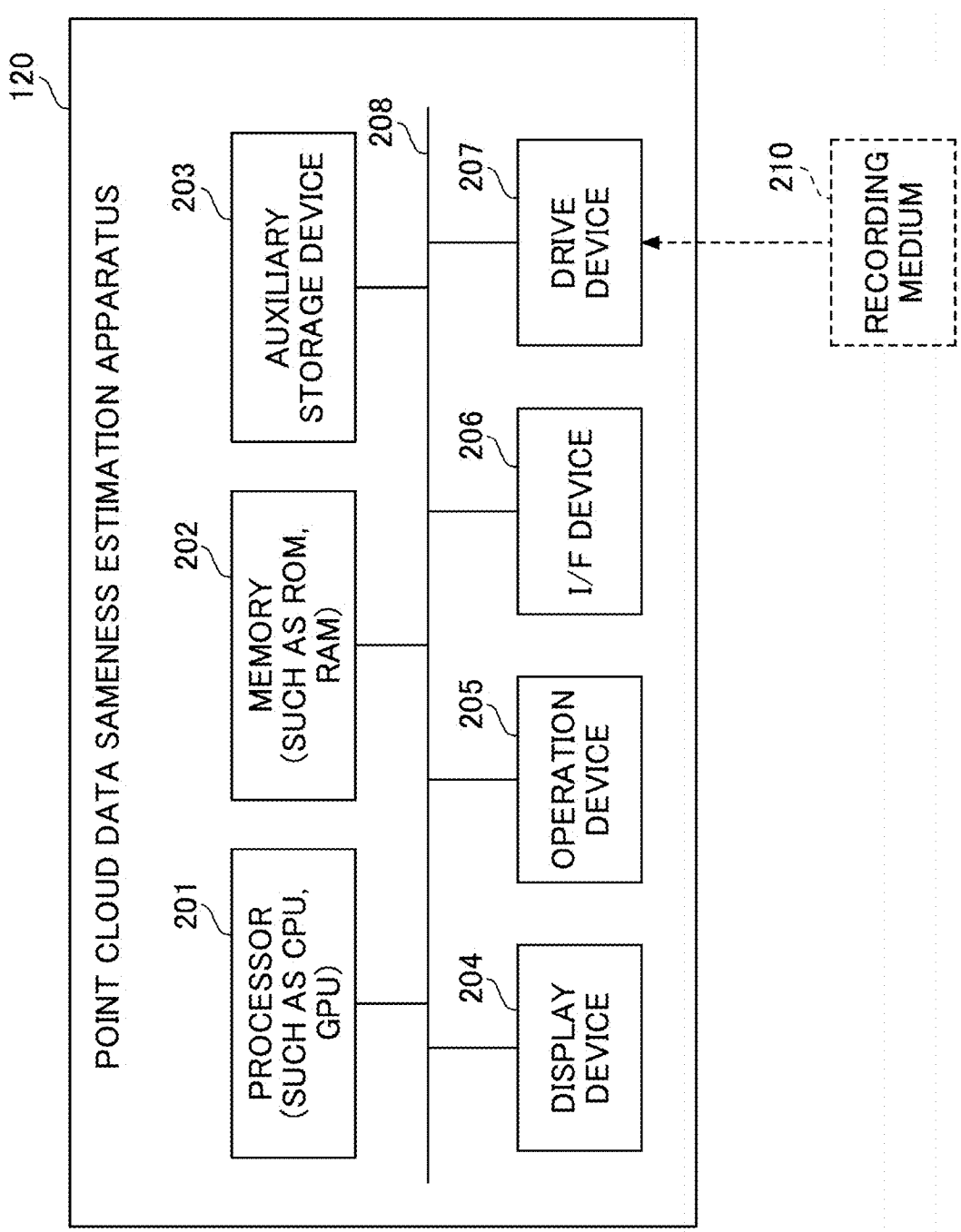
FIG. 2 is a diagram illustrating a hardware configuration example of a point cloud data sameness estimation apparatus.

Next, the hardware configuration of the point cloud data sameness estimation apparatus 120 is described. FIG. 2 is a diagram illustrating an example of a hardware configuration of a point cloud data sameness estimation apparatus.

As illustrated in FIG. 2, the point cloud data sameness estimation apparatus 120 includes a processor 201, a memory 202, an auxiliary storage device 203, a display device 204, an operation device 205, an I/F (Interface) device 206, and a drive device 207. Each of the hardware of the point cloud data sameness estimation apparatus 120 is mutually connected through a bus 208.

The processor 201 includes various processing devices such as a CPU (Central Processing Unit) and a GPU (Graphics Processing Unit). The processor 201 reads out various programs from the memory 202 for execution.

The memory 202 includes main storage devices such as ROM (Read Only Memory) and RAM (Random Access Memory). As the processor 201 and the memory 202 form what is termed a computer, the computer implements the above functions (See FIG. 1) by executing various programs read from the memory 202 by the processor 201.

The auxiliary storage device 203 stores various programs or various data used when various programs are executed by the processor 201. The training data storage unit 126 and the inference data storage unit 127 are implemented by the auxiliary storage device 203.

The display device 204 is a display device for displaying the internal state of the point cloud data sameness estimation apparatus 120. The operation device 205 is an input device used when the user of the point cloud data sameness estimation apparatus 120 inputs various instructions to the point cloud data sameness estimation apparatus 120. The I/F device 206 is a connection device for connecting to the first measuring device 110 and the second measuring device 111 and for receiving 3-dimensional point cloud data.

The drive device 207 is a device for setting a recording medium 210. The recording medium 210 herein includes a medium for recording information optically, electrically, or magnetically such as a CD-ROM, flexible disk, magneto-optical disk, and the like. Additionally, the recording medium 210 may include semiconductor memory electrically recording information such as ROM and flash memory.

The various programs installed in the auxiliary storage device 203 are installed, for example, by the distributed recording medium 210 being set in the drive device 207 and the various programs recorded in the recording medium 210 being read by the drive device 207. Alternatively, the various programs installed in the auxiliary storage device 203 may be installed by being downloaded through a network that is not illustrated.

Specific Example of Training Data

Figure 3:
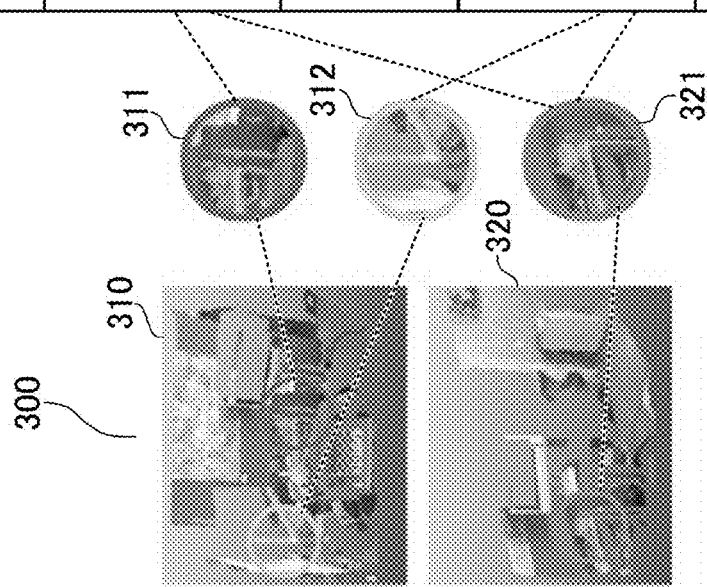
FIG. 3 is a diagram illustrating an example of training data.

Next, a specific example of training data stored in the training data storage unit 126 is explained. FIG. 3 is a diagram illustrating an example of training data. As illustrated in FIG. 3, the training data 300 includes, as information items, "first point cloud data", "second point cloud data", and "labels".

In "first point cloud data", multiple local 3-dimensional point cloud datasets, divided from 3-dimensional point cloud data 310 obtained by measurements by the first measuring device 110 of the object, are stored.

In the example of FIG. 3, specific examples of local 3-dimensional point cloud data 311, 312 are illustrated as multiple local 3-dimensional point cloud datasets. As illustrated in FIG. 3, local 3-dimensional point cloud data 311, 312 include the X coordinate, Y coordinate, Z coordinate, R value, G value, and B value of each point. Additionally, in the case of the example of FIG. 3, the local 3-dimensional point cloud data 311, 312 include a point cloud of 2048 points.

In "second point cloud data", multiple local 3-dimensional point cloud datasets, divided from 3-dimensional point cloud data 320 obtained by measurements by the second measuring device 111 of the object, are stored.

In the example of FIG. 3, specific examples of local 3-dimensional point cloud data 321 are illustrated as multiple local 3-dimensional point cloud datasets. As illustrated in FIG. 3, local 3-dimensional point cloud data 321 includes the X coordinate, Y coordinate, Z coordinate, R value, G value, and B value of each point. Additionally, in the case of the example of FIG. 3, the local 3-dimensional point cloud data 321 includes a point cloud of 2048 points.

In "label", either of "same" or "not same" is stored as information indicating whether or not two mutually associated local 3-dimensional point cloud datasets are generated from a same 3-dimensional shape, with respect to local 3-dimensional point cloud data of "first point cloud data" and local 3-dimensional point cloud data of "second point cloud data".

For example, as local 3-dimensional point cloud data 311 and local 3-dimensional point cloud data 321 are generated from the same 3-dimensional shape, "same" is stored in "label". These constitute an example of first training data.

Conversely, as local 3-dimensional point cloud data 312 and local 3-dimensional point cloud data 321 are generated from different 3-dimensional shapes, "not same" is stored in "label". These constitute an example of second training data.

Details of Functional Configuration of Data Augmentation Unit

Figure 4:
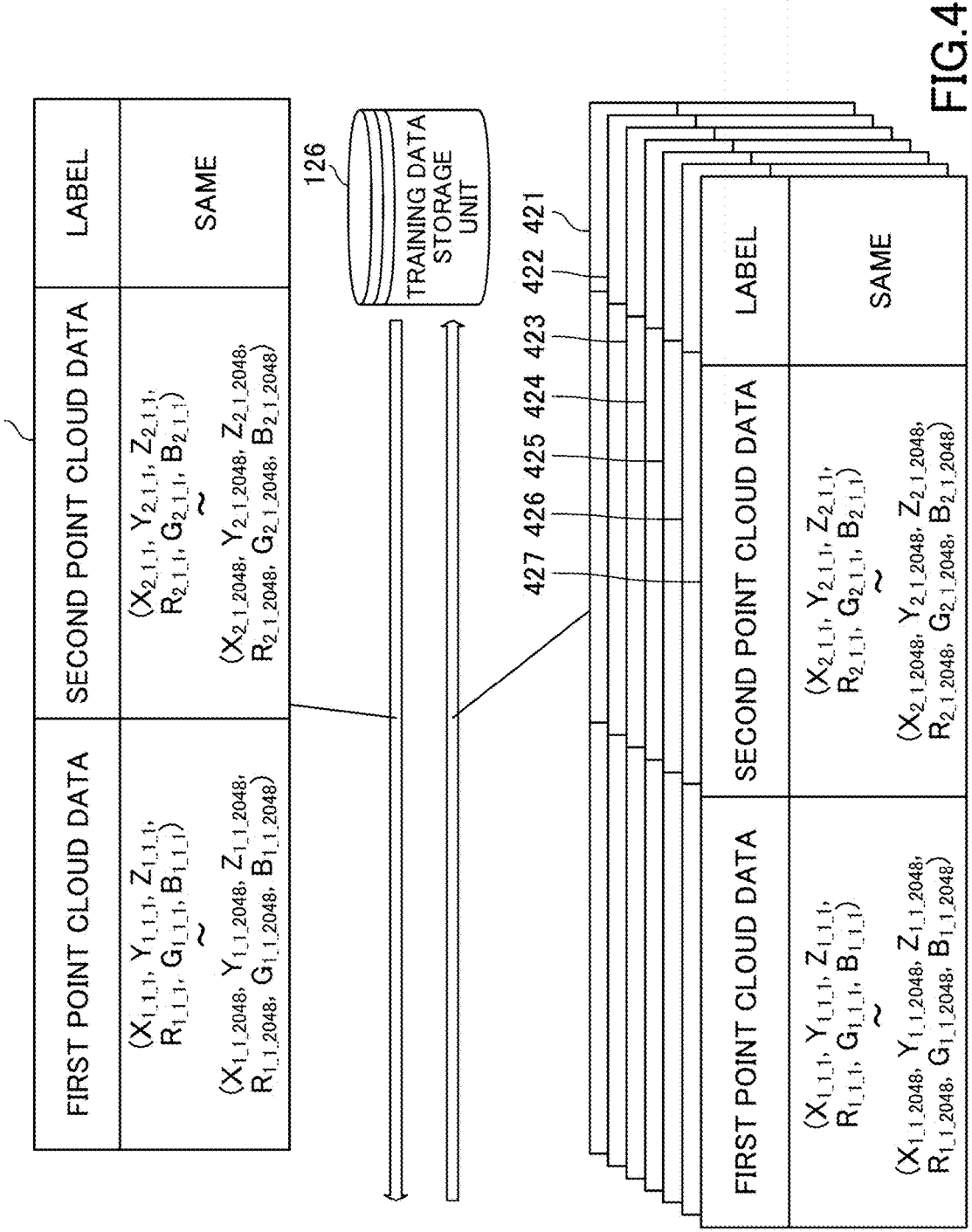
FIG. 4 is a diagram illustrating a functional configuration example of a data augmentation unit.

Next, details of the functional configuration of the data augmentation unit 123 are described. FIG. 4 is a diagram illustrating a functional configuration example of a data augmentation unit.

As illustrated in FIG. 4, the data augmentation unit 123 includes a reading unit 401, a density changing unit 402, a deleting unit 403, a noise-adding unit 404, a bias-adding unit 405, an angle changing unit 406, a scaling unit 407, and a shifting unit 408.

The reading unit 401 reads out predetermined training data from the training data 300 stored in the training data storage unit 126. In the example of FIG. 4, a state of reading out training data 410 including the local 3-dimensional point cloud data 311 and 321, as predetermined training data, from the training data storage unit 126 is indicated. The predetermined training data read out by the reading unit 401 refers to training data in which information indicating "same" in "label" is stored.

The density changing unit 402 modifies the density of respective points by thinning out points at a constant interval, for the respective points of one local 3-dimensional point cloud dataset from among two local 3-dimensional point cloud datasets included in "first point cloud data" and "second point cloud data" of the training data 410. The density changing unit 402 stores training data 421 including local 3-dimensional point cloud data after modification in the training data storage unit 126.

The deleting unit 403 randomly deletes respective points of one local 3-dimensional point cloud dataset from among two local 3-dimensional point cloud datasets included in "first point cloud data" and "second point cloud data" of the training data 410. Additionally, the deleting unit 403 stores training data 422 including local 3-dimensional point cloud data after deleting in the training data storage unit 126.

The noise-adding unit 404 adds noise (points) at arbitrary locations of one local 3-dimensional point cloud dataset from among two local 3-dimensional point cloud datasets included in "first point cloud data" and "second point cloud data" of the training data 410. Additionally, the noise-adding unit 404 stores training data 423 including local 3-dimensional point cloud data after adding noise in the training data storage unit 126.

The bias-adding unit 405 adds a bias value to the R value, G value, B value of respective points of one local 3-dimensional point cloud dataset from among two local 3-dimensional point cloud datasets included in "first point cloud data" and "second point cloud data" of the training data 410 (in other words, changes the color). Additionally, the bias-adding unit 405 stores training data 424 including local 3-dimensional point cloud data after adding the bias value in the training data storage unit 126.

The angle changing unit 406 tilts one local 3-dimensional point cloud dataset, from among two local 3-dimensional point cloud datasets included in "first point cloud data" and "second point cloud data" of the training data 410, by a predetermined angle or greater. Additionally, the angle changing unit 406 stores training data 425 including local 3-dimensional point cloud data after tilting by a predetermined angle or greater in the training data storage unit 126. The training data 425 is an example of fourth training data.

Additionally, the angle changing unit 406 changes the "label" from "same" to "not same" for training data 425 including local 3-dimensional data after tilting by a predetermined angle or greater. If one of the two local 3-dimensional point cloud datasets is tilted at a predetermined angle or greater, the two local 3-dimensional point cloud datasets can be regarded as being from 3-dimensional shapes that are different from each other.

Note that the angle changing unit 406 may not tilt or tilt by less than the predetermined angle one local 3-dimensional dataset from among the two local 3-dimensional datasets included in "first point cloud data" and "second point cloud data" of the training data 410. Additionally, the angle changing unit 406 may store the training data 425 including local 3-dimensional point cloud data not tilted or after being tilted by less than the predetermined angle in the training data storage unit 126. In this case the training data 425 is an example of third training data. Additionally, the angle changing unit 406 does not change "label" for the training data 425 in this case.

The scaling unit 407 enlarges or reduces one local 3-dimensional point cloud dataset, from among two local 3-dimensional point cloud datasets included in "first point cloud data" and "second point cloud data" of the training data 410, by a rate of increase or a rate of decrease that is outside a specified range. Additionally, the scaling unit 407 stores training data 426 including local 3-dimensional point cloud data after enlarging or reducing by a rate of increase or a rate of decrease that is outside a specified range, in the training data storage unit 126. The training data 426 is an example of sixth training data.

Additionally, the scaling unit 407 changes the "label" from "same" to "not same" for training data 426 including local 3-dimensional data after enlarging or reducing by a rate of increase or a rate of decrease that is outside a specified range. If one of the two local 3-dimensional point cloud datasets is enlarged or reduced by a rate of increase or a rate of decrease that is outside a specified range, the two local 3-dimensional point cloud datasets can be regarded as being from 3-dimensional shapes that are different from each other.

Note that the scaling unit 407 may keep two local 3-dimensional point cloud datasets included in the training data 410 at the same size or enlarge or reduce one of the local 3-dimensional point cloud datasets by a rate of increase or a rate of decrease within the predetermined range. Additionally, the scaling unit 407 may store training data 426 including local 3-dimensional point cloud data of same size or local 3-dimensional point cloud data after being increased or reduced by a rate of increase or a rate of decrease within the predetermined range in the training data storage unit 126. In this case the training data 426 is an example of fifth training data. Additionally, the scaling unit 407 does not change "label" for the training data 426 in this case.

The shifting unit 408 shifts the center position of one local 3-dimensional point cloud dataset from among two local 3-dimensional point cloud datasets included in "first point cloud data" and "second point cloud data" of the training data 410. Additionally, the shifting unit 408 stores training data 427 including local 3-dimensional point cloud data after shifting the central position in the training data storage unit 126.

In this way, by augmenting the training data 300 by the data augmentation unit 123, it becomes possible to pseudo generate two sets of local 3-dimensional point cloud data differing in each type of measuring condition, such as measuring direction or measuring position, measuring distance, measuring timing, type of device, and the like. Next, by using the training data 300 after augmentation, according to the first embodiment, the accuracy of evaluating sameness of two local 3-dimensional point cloud datasets differing by respective types of measuring conditions can be improved.

Details of Functional Configuration of Training Unit

Figure 5:
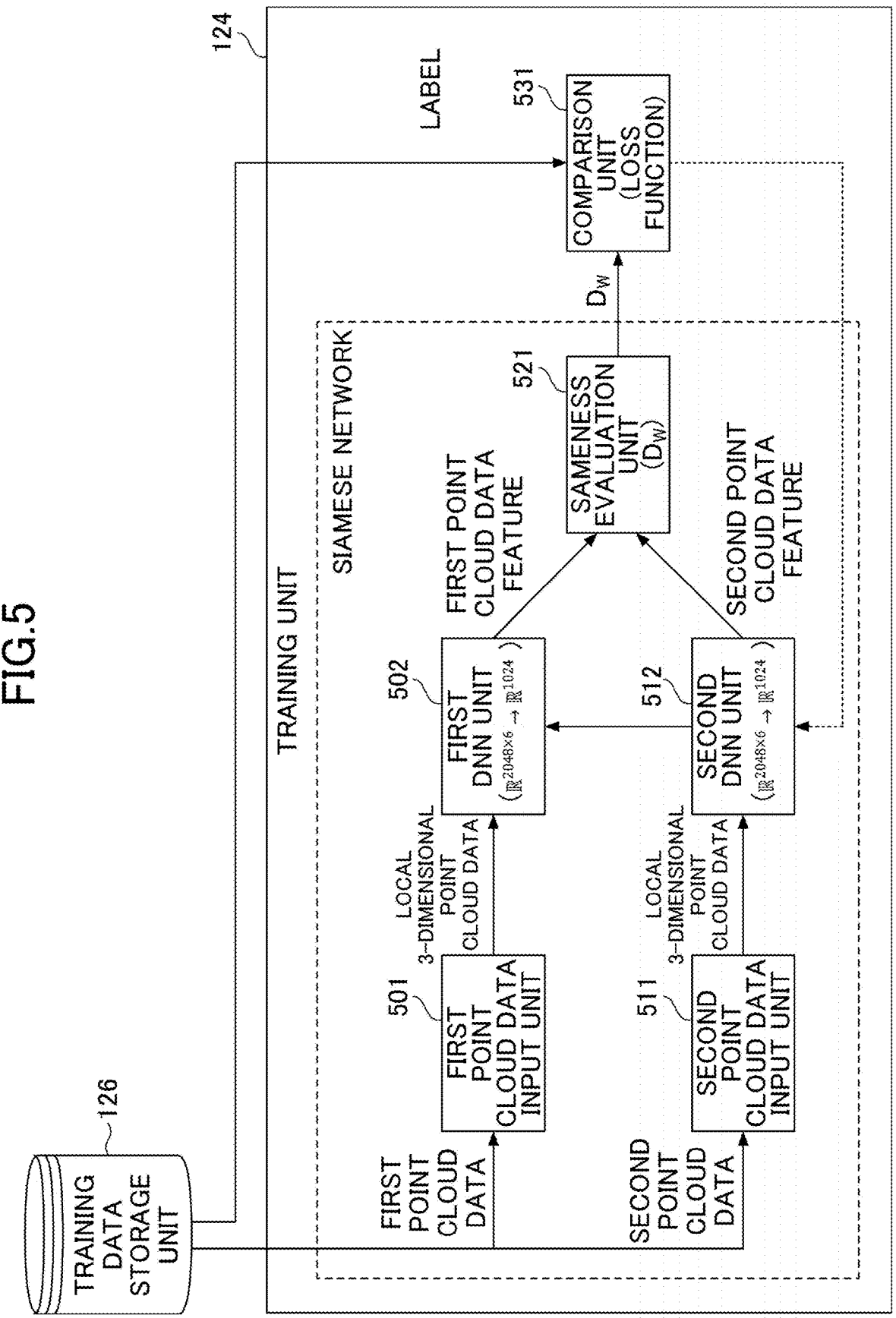
FIG. 5 is a diagram illustrating a functional configuration example of a training unit.

Next, details of the functional configuration of the training unit 124 are described. FIG. 5 is a diagram illustrating an example of a functional configuration of a training unit. As illustrated in FIG. 5, the training unit 124 uses a Siamese (Siamese) Network structure to infer whether or not two local 3-dimensional point cloud datasets are generated from the same 3-dimensional shapes (for evaluating sameness).

Specifically, as illustrated in FIG. 5, the training unit 124 includes a first point cloud data input unit 501, a first DNN unit 502, a second point cloud data input unit 511, a second DNN unit 512, and a sameness evaluation unit 521. Additionally, the training unit 124 includes a comparison unit 531.

The first point cloud data input unit 501 reads out local 3-dimensional point cloud data stored in "first point cloud data", from the training data 300 stored in the training data storage unit 126, for inputting into the first DNN unit 502. Additionally, the second point cloud data input unit 511 reads out local 3-dimensional point cloud data stored in "second point cloud data", from the training data 300 stored in the training data storage unit 126, for inputting into the second DNN unit 512.

Note that the local 3-dimensional point cloud data input by the first point cloud data input unit 501 and the local 3-dimensional point cloud data input by the second point cloud data input unit 511 are local 3-dimensional point cloud data associated with each other in the training data 300.

The first DNN unit 502 is an example of a first neural network, and for example, PointNet that is a DNN for 3-dimensional point cloud data is used. The first DNN unit 502 operates by local 3-dimensional point cloud data being input by the first point cloud data input unit 501 and outputs first point cloud data features (See Formula (1) below).

[Formula 1]

$$\mathbb{R}^{2048\times 6} \to \mathbb{R}^{1024} \qquad (1)$$

The above formula (1) shows that first point cloud data features including 1024 features are output from local 3-dimensional point cloud data including a point cloud of 2048 points.

The second DNN unit 512 is an example of a second neural network, and for example, PointNet that is a DNN for 3-dimensional point cloud data is used. The second DNN unit 512 operates by local 3-dimensional point cloud data being input by the second point cloud data input unit 511 and outputs second point cloud data features (See Formula (2) below).

[Formula 2]

$$\mathbb{R}^{2048\times 6} \rightarrow \mathbb{R}^{1024} \quad (2)$$

The above formula (2) shows that second point cloud data features including 1024 features are output from local 3-dimensional point cloud data including a point cloud of 2048 points.

The sameness evaluation unit 521 processes the first point cloud data features output by the first DNN unit 502 and the second point cloud data features output by the second DNN unit 512. Thereby, the sameness evaluation unit 521 outputs data (evaluation of sameness of two local 3-dimensional point cloud datasets) for inferring whether or not two local 3-dimensional point cloud datasets are generated from the same 3-dimensional shapes.

Specifically, the sameness evaluation unit 521 calculates a Euclidean distance $D_W$ for output (See Formula (3) below), to the comparison unit 531, based on a first point cloud data feature $pn_\alpha$ and a second point cloud data feature $pn_\beta$ output by the first DNN unit 502 and the second DNN unit 512.

[Formula 3]

$$D_w = \sqrt{(pn_\alpha - pn_\beta)^2} \quad (3)$$

Where, in formula (3) above, the first point cloud data feature $pn_\alpha$ and the second point cloud data feature $pn_\beta$ are assumed to satisfy formulas (4-1) and (4-2) below.

[Formula 4]

$$pn_\alpha \in \mathbb{R}^{1024} \quad (4\text{-}1)$$

$$pn_\beta \in \mathbb{R}^{1024} \quad (4\text{-}2)$$

In other words, evaluation of sameness of two local 3-dimensional point cloud datasets can be represented by the Euclidean distance $D_W$. Note that if the Euclidean distance $D_W$ is small, evaluation indicating a high degree of sameness can be output, and if the Euclidean distance $D_W$ is great, evaluation indicating a low degree of sameness can be output.

The comparison unit 531 calculates (see Formula (5) below) a loss function $L_C$ based on the Euclidean distance $D_W$ output by the sameness evaluation unit 521 and information indicating sameness (or difference) stored in "label" read out by the training data storage unit 126.

[Formula 5]

$$L_c = (1-C) \times \frac{1}{2} \times (D_w)^2 + C \times \frac{1}{2} \times \{\max(0, m - D_w)\} \quad (5)$$

Where, in Formula (5) above, for C, "0" is input if the label is "same" and "1" is input if "not same". Additionally, in Formula (5) above, m is the margin.

The comparison unit 531 updates the parameter weights of the first DNN unit 502 and the second DNN unit 512 by backpropagating the calculated loss function $L_C$.

Note that the parameter weights of the first DNN unit 502 and the parameter weights of the second DNN unit 512 are shared with each other, and when the loss function $L_C$ is backpropagated, the same weight parameter values are updated for the first DNN unit 502 and the second DNN unit 512.

Thereby, by propagating the loss function $L_C$ at time of training and updating while sharing parameter weights between the first DNN unit 502 and the second DNN unit 512, according to the training unit 124, effects for example the following are obtained:

parameter weights can be learned by point cloud data features being output suited to outputting evaluation of sameness of two local 3-dimensional point cloud datasets, and in the training data 300, even if there is deviation in the characteristics of the local 3-dimensional point cloud data stored in each of the "first point cloud data" and the "second point cloud data", parameter weights of high generalization ability can be learned.

As a result, according to the first embodiment, the accuracy of sameness evaluation can be improved.

Flow of Training Process

Figure 6:
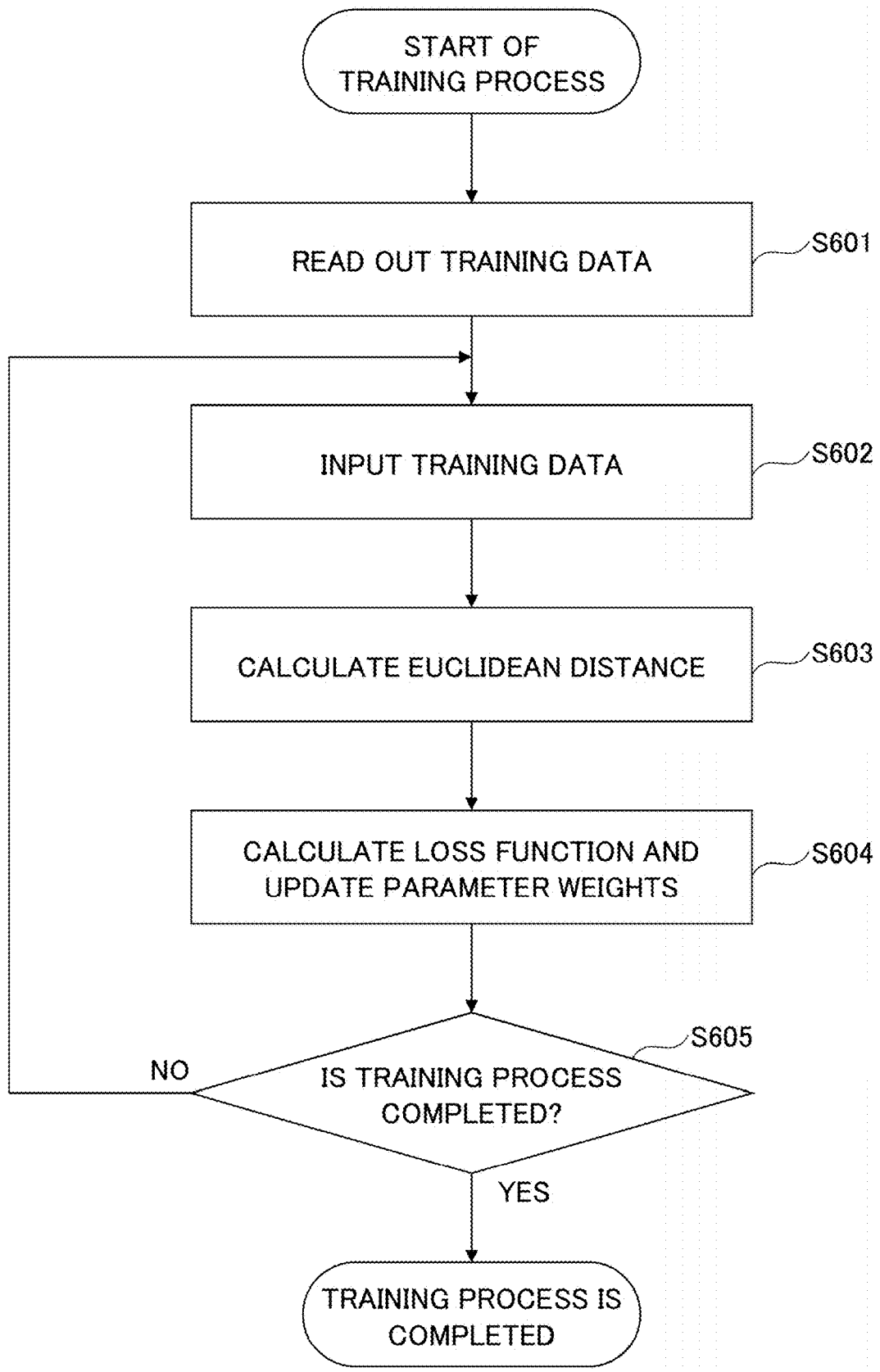
FIG. 6 is a flowchart illustrating a flow of a training process of the training unit.

Next, a flow of a training process according to the training unit 124 is described. FIG. 6 is a flowchart indicating a flow of a training process by the training unit.

In step S601, the first point cloud data input unit 501 and the second point cloud data input unit 511 read out multiple pairs of mutually associated local 3-dimensional point cloud datasets by the training data storage unit 126.

In step S602, the first DNN unit 502 and the second DNN unit 512 operate by a pair of read out local 3-dimensional point cloud datasets being input and output the first point cloud data feature $pn_\alpha$ and the second point cloud data feature $pn_\beta$.

In step S603, the sameness evaluation unit 521 calculates the Euclidean distance $D_W$ based on the first point cloud data feature $pn_\alpha$ and the second point cloud data feature $pn_\beta$.

In step S604, the comparison unit 531 calculates the loss function $L_C$ based on the calculated Euclidean distance $D_W$ and the label C read out by the training data storage unit 126. Additionally, the comparison unit 531 updates parameter weights shared by the first DNN unit 502 and the second DNN unit 512.

In step S605, the comparison unit 531 determines whether or not the training process is completed. In step S605, in the case of having determined that the training process is not completed (in the case of NO in step S605), the flow returns to step S602. Accordingly, the first point cloud data input unit 501 and the second point cloud data input unit 511 input to the first DNN unit 502 and to the second DNN unit 512 a pair of local 3-dimensional point cloud datasets associated with each other that has not yet been used for the training process.

Conversely, in step S605, in the case of having determined that the training process is completed (in the case of YES in step S605), the training process is completed, and the updated parameter weights are reflected in the inference unit 125.

Functional Configuration of Inference Unit

Figure 7:
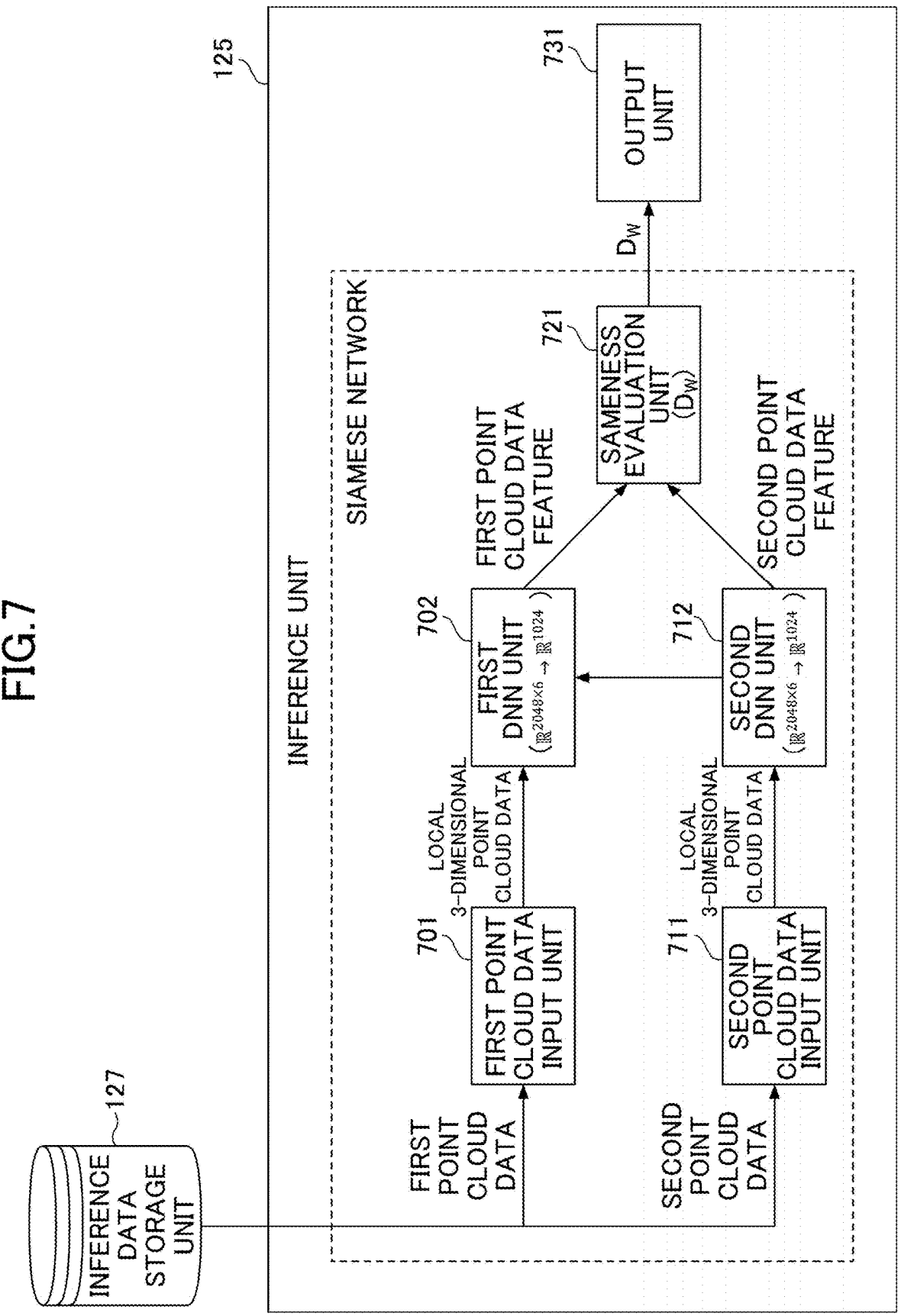
FIG. 7 is a diagram illustrating a functional configuration example of an inference unit.

Next, details of the functional configuration of the inference unit 125 are described. FIG. 7 is a diagram illustrating an example of a functional configuration of an inference unit. Similar to the training unit 124, the inference unit 125 uses a Siamese (Siamese) Network structure to infer whether or not two local 3-dimensional point cloud datasets are generated from the same 3-dimensional shapes (for evaluating sameness).

Specifically, as illustrated in FIG. 7, the inference unit 125 includes a first point cloud data input unit 701, a first DNN unit 702, a second point cloud data input unit 711, a second DNN unit 712, and a sameness evaluation unit 721. Additionally, the inference unit 125 includes an output unit 731.

The first point cloud data input unit 701 reads out local 3-dimensional point cloud data stored in "first point cloud data", from inference data stored in the inference data storage unit 127, for inputting into the first DNN unit 702. Additionally, the second point cloud data input unit 711 reads out local 3-dimensional point cloud data stored in "second point cloud data", from inference data stored in the inference data storage unit 127, for inputting into the second DNN unit 712.

Note that the inference data stored in the inference data storage unit 127 can be assumed to have the same structure as the training data 300 of FIG. 3, except for not including "label" as an information item.

Note that the local 3-dimensional point cloud data input by the first point cloud data input unit 701 and the local 3-dimensional point cloud data input by the second point cloud data input unit 711 are local 3-dimensional point cloud data associated with each other in the inference data.

The first DNN unit 702 is an example of a first neural network, is operated by local 3-dimensional point cloud data being input by the first point cloud data input unit 701, and outputs a first point cloud data feature $pn_\alpha$.

The second DNN unit 712 is an example of a second neural network, is operated by local 3-dimensional point cloud data being input by the second point cloud data input unit 711, and outputs a second point cloud data feature $pn_\beta$. Note that the same parameters are shared between the first DNN unit 702 and the second DNN unit 712.

The sameness evaluation unit 721 processes the first point cloud data feature output by the first DNN unit 702 and the second point cloud data feature output by the second DNN unit 712. Thereby, the sameness evaluation unit 721 outputs data (evaluation of sameness of two local 3-dimensional point cloud datasets) for inferring whether or not two local 3-dimensional point cloud datasets are generated from the same 3-dimensional shapes.

Specifically, the sameness evaluation unit 721 calculates a Euclidean distance $D_W$ for output to the output unit 731, based on a first point cloud data feature $pn_\alpha$ output by the first DNN unit 702 and a second point cloud data feature $pn_\beta$ output by the second DNN unit 712. As described above, if the Euclidean distance $D_W$ is small, evaluation indicating a high degree of sameness can be output, and if the Euclidean distance $D_W$ is great, evaluation indicating a low degree of sameness can be output.

The output unit 731 determines whether or not the Euclidean distance $D_W$ output by the sameness evaluation unit 721 is greater than or equal to a predetermined threshold (see formulas (6-1) and (6-2) below).

[Formula 6]

$$D_W > t_d \quad (6\text{-}1)$$

$$D_W \leq t_d \quad (6\text{-}2)$$

In the case of determining that the Euclidean distance $D_W$ is greater than the predetermined threshold $t_d$ (Formula (6-1) above), the output unit 731 outputs "not same" as evaluation of sameness. Conversely, in the case of determining that the Euclidean distance $D_W$ is less than or equal to the predetermined threshold $t_d$ (Formula (6-2) above), the output unit 731 outputs "same" as evaluation of sameness.

Thereby, at time of inference, by using the first DNN unit 702 and the second DNN unit 712 of which the weights are shared, according to the inference unit 125, effects for example the following are obtained:

point cloud data features suited to outputting evaluation of sameness of two local 3-dimensional datasets can be output, and as evaluation of sameness, the same data can be output regardless of which units of the first DNN unit 702 and the second DNN unit 712 are input with respect to the two local 3-dimensional point cloud datasets.

As a result, according to the first embodiment, the accuracy of sameness evaluation can be improved.

Flow of Inference Process

Figure 8:
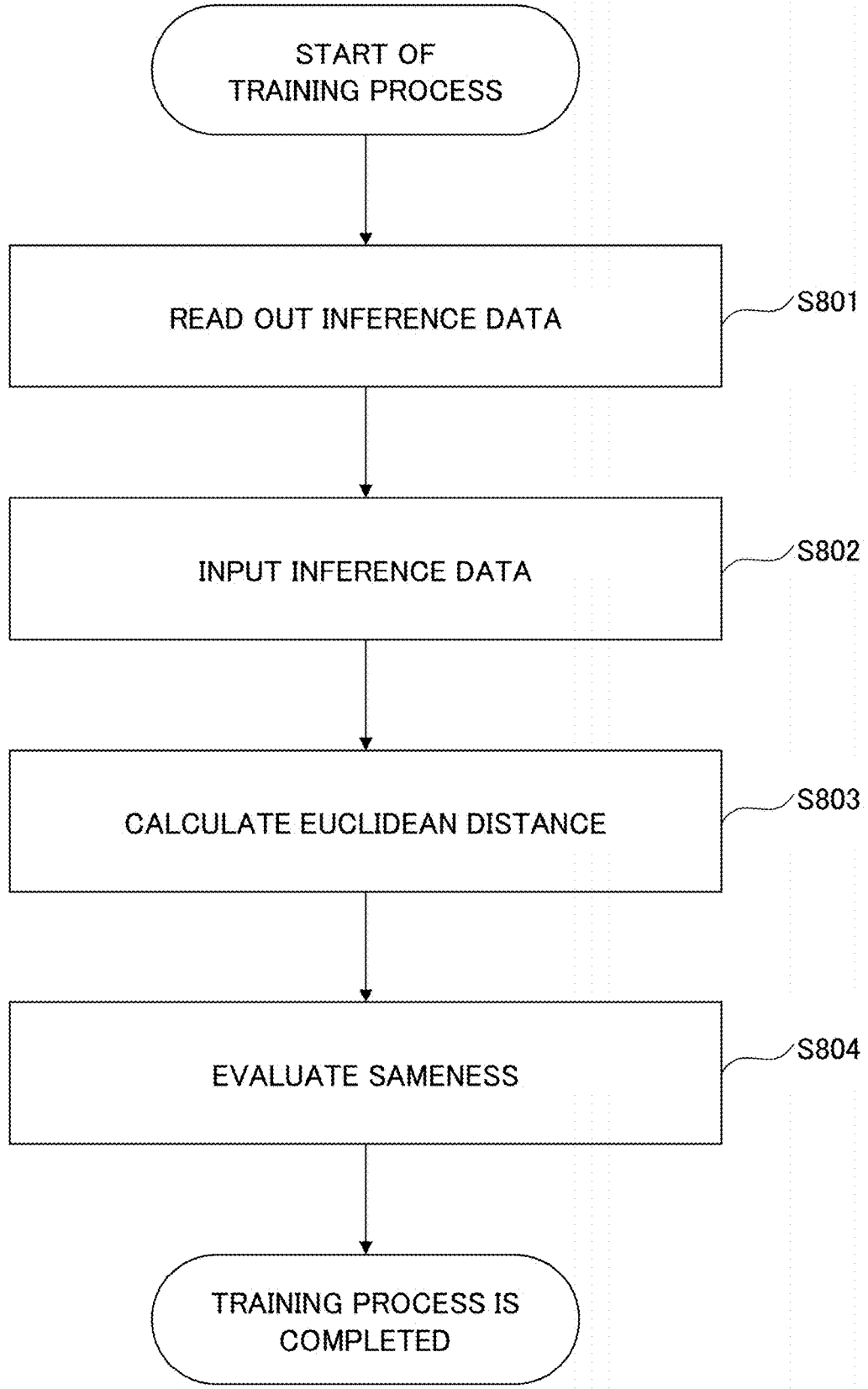
FIG. 8 is a flowchart illustrating a flow of an inference process of the inference unit.

Next, a flow of an inference process according to the inference unit 125 is described. FIG. 8 is a flowchart for indicating a flow of an inference process by the inference unit.

In step S801, the first point cloud data input unit 701 and the second point cloud data input unit 711 read out two mutually associated local 3-dimensional point cloud datasets from the inference data storage unit 127.

In step S802, the first DNN unit 702 and the second DNN unit 712 operate by a pair of read out local 3-dimensional point cloud datasets being input and output the first point cloud data feature $pn_\alpha$ and the second point cloud data feature $pn_\beta$.

In step S803, the sameness evaluation unit 721 calculates the Euclidean distance $D_W$ based on the first point cloud data feature $pn_\alpha$ and the second point cloud data feature $pn_\beta$.

In step S804, the output unit 731 outputs a sameness evaluation ("same" or "not same"), based on the Euclidean distance $D_W$ output by the sameness evaluation unit 721.

Specific Example of Inference Result

Next, a specific example of an inference result by the inference unit 125 is described. FIG. 9 is a diagram illustrating a specific example of an inference result.

Within the above, 9a of FIG. 9 illustrates the concept of inference data using the inference process. In 9a of FIG. 9, in "type of object", types of object measured by the first measuring device 110 and the second measuring device 111 are indicated.

Additionally, in 9a of FIG. 9, in "number of pairs of local 3-dimensional point cloud datasets that are the same", from among the multiple local 3-dimensional point cloud datasets included in the corresponding "type of object", the number of pairs of local 3-dimensional point cloud datasets generated from the same 3-dimensional shape is stored. Additionally, in "number of pairs of local 3-dimensional point cloud datasets that are not the same", from among the multiple local 3-dimensional point cloud datasets included in the corresponding "type of object", the number of pairs of local 3-dimensional point cloud datasets generated from different 3-dimensional shapes is stored.

Additionally, 9b of FIG. 9 indicates the precision per "type of object", for the inference result inferred by the inference unit 125, using the inference data indicated in 9a of FIG. 9 as input data. As indicated in 9b of FIG. 9, a high precision can be achieved with the inference unit 125, regardless of "type of object".

Summary

As is clear from the description above, with respect to a point cloud data sameness estimation system in relation to the first embodiment, a point cloud data sameness estimation apparatus includes a first point cloud data acquisition unit and a second point cloud data acquisition unit configured to acquire first point cloud data and second point cloud data including 3-dimensional point cloud data.

includes a first neural network configured to output a first point cloud data feature, with information about the first point cloud data as an input into the first neural network; and a second neural network configured to output a second point cloud data feature, with information about the second point cloud data as an input into the second neural network;

includes a sameness evaluation unit configured to output evaluation of sameness of first point cloud data and second point cloud data, based on the first point cloud data feature and the second point cloud data feature.

shares parameter weights commonly between the first DNN unit and the second DNN unit.

Thereby, according to the first embodiment, for 3-dimensional point cloud data, a point cloud data sameness estimation apparatus and a point cloud data sameness estimation system which improve accuracy of sameness evaluation can be provided.

2$^{nd}$ Embodiment

In the above 1$^{st}$ embodiment, the information about the point cloud data was described as being 3-dimensional point cloud data itself. However, the information about the point cloud data is not limited to 3-dimensional point cloud data itself, and may be mesh data (polygon data) or surface data, CAD data and the like.

Additionally, in the first embodiment, reference was not made to the manner of association in the case of storing two local 3-dimensional datasets prepared from different 3-dimensional shapes as the training data 300. However, when associating two local 3-dimensional point cloud datasets, for example, the respective 3-dimensional shapes may be associated with each other with limitation to 3-dimensional point cloud data located within a predetermined distance.

Additionally, in the first embodiment, from among the respective units included in the data augmentation unit 123, training data of which "label" is "same" and training data of which "label" is "not same" were described as being generated in accordance with extent of modification, in the case of modifying the angle of the angle changing unit 406, and in the case of modifying the size of the scaling unit 407.

However, also for the respective units apart from the angle changing unit 406 and the scaling unit 407, training data of which "label" is "same" and training data of which "label" is "not same" can similarly be generated in accordance with extent of modification.

Additionally, in the above first embodiment, the data augmentation unit 123 was described for the case of augmenting training data 300 with reading out of training data of which "label" is "same". However, the read out training data when the data augmentation unit 123 augments the training data 300 is not limited thereto, and training data of which "label" is "not same" may be read out.

Thereby, for example, in the case of separate specimens having the same 3-dimensional shape and differing only in color or in material, it becomes possible to avoid a situation of erroneously outputting "they are the same" as evaluation of sameness.

Additionally, in the above first embodiment, the respective units included in the data augmentation unit 123 were described in the case of augmenting the training data 300. However, the augmentation method of the training data 300 is not limited thereto, and the training data 300 may be augmented by artificially modifying the various measurement conditions.

For example, instead of the density changing unit 402 or the scaling unit 407 being operated, the training data 300 may be augmented by modifying the distance from the first measuring device 110 to the object, or by changing the type of the first measuring device 110.

Additionally, for example, instead of the angle changing unit 406 being operated, the training data 300 may be augmented by modifying the measurement direction, tilting the angle of the first measuring device 110. Additionally, for example, instead of the shifting unit 408 being operated, the training data 300 may be augmented by shifting the measurement location of the first measuring device 110. Additionally, for example, instead of the noise-adding unit 404 or the bias-adding unit 405 being operated, the training data 300 may be augmented by modifying the brightness of lights in the real environment 130 or by modifying the measurement timing of the first measuring device 110.

Additionally, in the above first embodiment, the sameness evaluation unit 521 was described in the case of outputting the Euclidean distance $D_W$ calculated based on the first point cloud data feature and the second point cloud data feature, as evaluation of sameness. However, the output method of evaluation of sameness according to the sameness evaluation unit 521 is not limited thereto, and data calculated using another function may be output as evaluation of sameness. Alternatively, data calculated by a method other than a function (for example, using a NN) may be output as the evaluation of sameness.

Additionally, in the above first embodiment, the point cloud data sameness estimation apparatus 120 is described as including the training unit 124 and the inference unit 125. However, the training unit 124 and the inference unit 125 may be configured in separate apparatuses.

While the embodiments have been described, it will be understood that various modifications of form and description may be made without departing from the spirit and scope of the claims.

The present application is based on and claims priority to Japanese patent application No. 2019-181004 filed on Sep. 30, 2019 with the Japanese Patent Office, the entire contents of which are hereby incorporated by reference.

DESCRIPTION OF REFERENCE NUMERALS

100: point cloud data sameness estimation system
110, 111: first, second measuring device
120: point cloud data sameness estimation apparatus
121: data acquisition unit
122: data conversion unit
123: data augmentation unit
124: training unit
125: inference unit
300: training data
310, 320: 3-dimensional point cloud data
311, 312, 321: local 3-dimensional point cloud data
401: reading unit
402: density changing unit
403: deleting unit
404: noise-adding unit
405: bias-adding unit
406: angle changing unit
407: scaling unit
408: shifting unit
501: first point cloud data input unit 502: first DNN unit
511: second point cloud data input unit
512: second DNN unit
521: sameness evaluation unit
531: comparison unit
701: first point cloud data input unit
702: first DNN unit
711: second point cloud data input unit
712: second DNN unit
721: sameness evaluation unit
731: output unit

The invention claimed is:

1. A point cloud data sameness estimation apparatus for estimating sameness of objects that are sources of two 3-dimensional point cloud datasets, comprising:
   a memory;
   a processor coupled to the memory:
   a first neural network configured to output a first point cloud data feature, with information about the first point cloud data as an input into the first neural network; and
   a second neural network configured to output a second point cloud data feature, with information about the second point cloud data as an input into the second neural network;
   wherein a weight is mutually shared by the first neural network and the second neural network,
   wherein the processor is configured to:
   acquire the first point cloud data feature, the second point cloud data feature and a label, the first point cloud data feature and the second point cloud data feature each including 3-dimensional point cloud data, the label indicating whether or not the first point cloud data and the second point cloud data are generated respectively based on a same 3-dimensional shape of an object,
   output an evaluation about sameness of the first point cloud data and the second point cloud data, based on the first point cloud data feature and the second point cloud data feature,
   calculate a gap between the evaluation and the label, and update the weight based on the gap, and wherein
   in a case when the first point cloud data and the second point cloud data are generated based on first 3-dimensional shape and second 3-dimensional shape, respectively, the first 3-dimensional shape being same as the second 3-dimensional shape, information about a point cloud data set of the first point cloud data and the second point cloud data is first training data labeled by the label as being identical, and
   in a case when the first point cloud data and the second point cloud data are generated based on first 3-dimensional shape and second 3-dimensional shape, respectively, the first 3-dimensional shape being different from the second 3-dimensional shape, information about the point cloud data set of the first point cloud data and the second point cloud data is second training data labeled by the label as being non-identical.

2. The point cloud data sameness estimation apparatus according to claim 1, wherein, in the first training data, part of data included in at least one of the first point cloud data and the second point cloud data is missing or noise is added to at least one of the first point cloud data and the second point cloud data.

3. The point cloud data sameness estimation apparatus according to claim 1, wherein the first training data is the information about the point cloud data set of the first point cloud data and the second point cloud data being generated respectively based on the same 3-dimensional shape measured under different conditions.

4. The point cloud data sameness estimation apparatus according to claim 1, wherein the information about the first point cloud data and the information about the second point cloud data are each 3-dimensional point cloud data.

5. The point cloud data sameness estimation apparatus according to claim 4,
   in a case when one of the first point cloud data and the second point cloud data is generated from a predetermined 3-dimensional shape and the other of the first point cloud data and the second point cloud data is generated from the predetermined 3-dimensional shape being not tilted or tilted by less than a predetermined angle, information about a point cloud data set of the first point cloud data and the second point cloud data is third training data labeled by the label as being identical, and
   in a case when one of the first point cloud data and the second point cloud data is generated from a predetermined 3-dimensional shape and the other of the first point cloud data and the second point cloud data is generated from the predetermined 3-dimensional shape being tilted by the predetermined angle or greater, information about the point cloud data set of the first point cloud data and the second point cloud data is fourth training data labeled by the label as being non-identical.

6. The point cloud data sameness estimation apparatus according to claim 4,
   in a case when one of the first point cloud data and the second point cloud data is generated from a predetermined 3-dimensional shape and the other of the first point cloud data and the second point cloud data is generated from the predetermined 3-dimensional shape being a same size or the predetermined 3-dimensional shape being increased or reduced by a rate of increase or a rate of decrease within a predetermined range, information about a point cloud data set of the first point cloud data and the second point cloud data is fifth training data labeled by the label as being identical, and
   in a case when one of the first point cloud data and the second point cloud data is generated from a predetermined 3-dimensional shape and the other of the first point cloud data and the second point cloud data is generated from the predetermined 3-dimensional shape being increased or reduced by the rate of increase or the rate of decrease outside the predetermined range, information about the point cloud data set of the first point cloud data and the second point cloud data is sixth training data labeled by the label as being non-identical.

7. A point cloud data sameness estimation system comprising:
   a measuring device configured to measure an object and generate 3-dimensional data; and
   a point cloud data sameness estimation apparatus for estimating sameness of objects that are sources of two 3-dimensional point cloud datasets,
   wherein the point cloud data sameness estimation apparatus includes:
   a memory;
   a processor coupled to the memory;
   a first neural network configured to output a first point cloud data feature, with information about the first point cloud data as an input into the first neural network; and a second neural network configured to output a second point cloud data feature, with information about the second point cloud data as an input into the second neural network;

wherein a weight is mutually shared by the first neural network and the second neural network, wherein the processor is configured to:

acquire the first point cloud data feature, the second point cloud data feature and a label, the first point cloud data feature and the second point cloud data feature each including 3-dimensional point cloud data, the label indicating whether or not the first point cloud data and the second point cloud data are generated respectively based on a same 3-dimensional shape of an object, output an evaluation about sameness of the first point cloud data and the second point cloud data, based on the first point cloud data feature and the second point cloud data feature, calculate a gap between the evaluation and the label, and update the weight based on the gap, and wherein in a case when the first point cloud data and the second point cloud data are generated based on first 3-dimensional shape and second 3-dimensional shape, respectively, the first 3-dimensional shape being same as the second 3-dimensional shape, information about a point cloud data set of the first point cloud data and the second point cloud data is first training data labeled by the label as being identical, and in a case when the first point cloud data and the second point cloud data are generated based on first 3-dimensional shape and second 3-dimensional shape, respectively, the first 3-dimensional shape being different from the second 3-dimensional shape, information about the point cloud data set of the first point cloud data and the second point cloud data is second training data labeled by the label as being non-identical.

* * * * *